United States Patent [19]
Willey et al.

[11] 3,945,587
[45] Mar. 23, 1976

[54] SADDLE PAWL AND PENDULUM SUPPORT FOR VEHICLE SENSITIVE INERTIAL RETRACTORS

[75] Inventors: Ronald Albert Willey, Port Huron; Robert John Rumpf, Grosse Pointe, both of Mich.

[73] Assignee: The Firestone Tire & Rubber Company, Akron, Ohio

[22] Filed: Nov. 12, 1974

[21] Appl. No.: 523,008

[52] U.S. Cl. .................................. 242/107.4 A
[51] Int. Cl.² ................................... B65H 75/48
[58] Field of Search ............ 242/107.4 R, 107.4 A; 297/388; 280/150 SB

[56] References Cited
UNITED STATES PATENTS

| | | | |
|---|---|---|---|
| 3,508,720 | 4/1970 | Kell | 242/107.4 |
| 3,578,260 | 5/1971 | Kell | 242/107.4 |
| 3,722,824 | 3/1973 | Hayashi | 242/107.4 |
| 3,758,044 | 9/1973 | Nilsson | 242/107.4 |
| 3,838,831 | 10/1974 | Bell | 242/107.4 |
| 3,989,367 | 1/1970 | Kovacs | 242/107.4 |

*Primary Examiner*—Edward J. McCarthy
*Attorney, Agent, or Firm*—Miller, Morriss, Pappas & McLeod

[57] ABSTRACT

A saddle pawl and pendulum support for vehicle sensitive inertial retractors having a saddle element which pivotally supports a pawl and which also supports, in spaced-apart relation, a pendulum operable on an omnidirectional seat. The pendulum includes a head element detachable from the pendulum mass and the head element rests on the circular knife edge of the seat and registers beneath a tab extension of the pawl so that upon the tilting of the pendulum in respect to the vertical axis through the seat, the head tilts and engages the tab and tilts the pawl into locking engagement with rotary ratchet teeth provided on a retractor drum or spool. The mass of the pendulum depends beneath the seat and is secured to the head by means of a rod which extends axially through the circular knife edge seat. The saddle element is supported as a separate assembly in a retractor housing in an established dimensional relationship to the spring biased retractor reel or drum so that the pawl lockably engages the ratchet flanges of the drum upon sensing inertial imbalance in the vehicle in which the retractor is located. The pawl is fulcrumed in the saddle on an axis transverse of the vertical axis of the pendulum and offset therefrom. The weight bias on the pawl is such as to maintain it normally out of contact with the ratchet of the drum or reel. The saddle is supported by the retractor frame and positioned intermediate the upstanding flanges of the retractor frame.

7 Claims, 4 Drawing Figures

SADDLE PAWL AND PENDULUM SUPPORT FOR VEHICLE SENSITIVE INERTIAL RETRACTORS

The present invention is a saddle pawl and pendulum support for vehicle sensitive inertial retractors and most particularly for that type of retractor which is activated to lock by a pendulum which is responsive to vehicular changes in acceleration or deceleration by the vehicle in which the retractor is mounted.

Retractors are spring biased reels or drums biased to rewind loose safety harness or webbing when such webbing is not in use by a driver or passenger. The retractor is usually (but not always) a part of the terminal hardware in safety harness arrangements for all manner of vehicles. They perform a housekeeping and receptacle function and allow any selected amount of webbing withdrawal to adjust for variant seat position and various physical characteristics of the users. Some retractors are termed locking retractors and these are locked by manipulation of the webbing by manual means or by a time or delay actuation which closes the locking element, such as a pawl, against a ratchet or similar stop surface in prevention of further withdrawal of webbing. When the trip condition is met, further withdrawal is unavailable. Rewind may always occur when there is slack in the harness. Other retractors are of the inertial type. They provide the housekeeping and adjustment features but they are responsive and lock to a sensed inertial imbalance which occurs in the dynamics of vehicular movement. Such retractor devices are in two categories: (a) webbing sensitive, as where the webbing moves with the projectile tendencies of the passenger or driver (as in crashes or braking) and on acceleration or deceleration beyond selected thresholds the acceleration of the drum consequent to the inertial force is sensed and causes a locking mechanism such as a pawl to block withdrawal of webbing from the drum until the relaxation of the system and restoration of conditions below the sensitive threshold and (b) the vehicle sensitive type retractors where the pawl responds to forces acting on the vehicle and the chassis or frame of the retractor. The inertial imbalance from acceleration or deceleration of the vehicle is sensed by an inertial sensor such as a pendulum which registers consequent relative change of position and the change of position in the sensor acts directly or indirectly on a lock or restraint mechanism such as a pawl engaging a ratchet and preventing further webbing withdrawal. Some of these latter devices are position sensitive, meaning that the inertial sensing structure may operate, for example, only in the direction or path of vehicle movement. Other such devices are omnidirectional and their sensing extends to sense force imbalance from all directions, as for example, from side impacts or quartering impacts as well as from the impacts occurring in the line of travel. There are also combinations of both webbing sensitive and vehicle sensitive structures in the same retractor providing back-up or redundant locking features.

The present invention relates to the vehicle sensitive systems in which inertia activates a pendulum sensor and the pendulum thereupon acts on the pawl element for locking the retractor against withdrawal and more particularly the invention relates to the embodiment of the sensor and pawl in an assembly for locking under reaction to inertial change that is separately assembled and then staked or otherwise secured into a retractor frame so that dimensional control over the mounting can be held within tolerable limits so that upon installation the pawl is dimensionally properly related to the ratchet for the accomplishment of locking without accumulated error as in prior systems of pendulum and pawl pivot support.

BACKGROUND OF THE INVENTION

The closest art known to applicants is expressed in the U.S. Pat. No. 3,489,367 to Kovacs, et al.; U.S. Pat. Nos. 3,508,720 and 3,578,260 to Kell; and U.S. Pat. No. 3,758,044 to Nilsson.

None of these pieces of art show or propose a saddle supporting the pendulum and pawl and the saddle suspended between the flanges of a retractor frame or chassis and wherein the saddle is a complete subassembly ready to be installed in the retractor frame.

Accordingly, the principal object of the invention is to provide a new and inventive pendulum and pawl support useful in seat belt retractors.

Another object is to provide a saddle structure in which the tolerances arising from the mounting of pawl and pendulum are delimited and so that upon mounting the pawl to retractor dimension is held to good manufacturing tolerance.

Another object is to provide a symmetrical saddle support supportable between the upstanding flanges of the retractor frame or chassis so that the pawl element tilts on an axis transverse of the frame to engage the ratchet flanges of the webbing spool or drum.

Still another object is to teach a simplified form of pendulum inertial sensor so that assembly of the structure is facilitated while providing omnidirectional sensing.

Other objects including improved economy and the marriage of plastic or resin in the saddle to steel in the frame will be increasingly appreciated as the description proceeds.

It will be appreciated that no reel locking stresses are felt by the saddle structure and the pawl carries the lock stresses into the frame.

GENERAL DESCRIPTION

In general, the invention comprises a saddle element having two pairs of outboard protuberances and a web or platform therebetween which are pierced vertically and have a seat or support of the circular knife edge type provided therein. One pair of the outboard protuberances are in spaced-apart parallel axial relation and include fulcrum support means which impinge on a pawl bar to form the pivotal axis for the pawl element and pawl bar. The pawl element is thus positionally secured in the saddle.

The pawl element includes ratchet engaging teeth extending in one direction and a tab extension which extends in an opposite direction from the axis established by the pawl bar. The extension overlays the seat for the omnidirectional pendulum and is biased toward engagement with the head of the pendulum. The pendulum comprises a head, a rod extension from the head and a depending mass selectively attachable and detachable to the rod as by threaded or upset means and selectively locatable on the rod. Assembly is by dropping the rod axially through the seat opening so that the head rests upon the seat and by then attaching the mass to the end of the rod so that the mass depends axially and vertically from the seat unless influenced by inertial imbalancing forces.

The flanges of the retractor frame or chassis are lanced to tiltably receive the saddle element in such manner that the two pairs of protuberances are supported in the lanced openings. These protuberances may be staked or otherwise secured against chance dislodgement and the lanced portions of the frame constitute thrust abutments which carry the lock stresses on the pawl into the frame. When the retractor motor is rewinding webbing, the ratchet is disposed so that the retracting force kicks the pawl teeth out of engagement with the ratchet. This minimum stress on rewind is the only force tending to dislodge the pawl support protuberances. Under locking stresses the pawl translates the lock forces through the saddle and into the frame at the journal openings. The web beneath the pawl bar limits the movement of the pawl bar by providing a thrust resisting abutment in prevention of the harness forces upsetting the pawl. As thus constructed, the retractor can be most rudimentary, including a well known spring return motor which biases the drum to rewind webbing on the drum and yet which bias can be overcome to extend a desired amount of webbing from the drum. The drum includes ratchet means in interference relation with the pawl when the pawl is tilted by the action of the pendulum. The webbing is wound on the drum and withdrawn as necessary against the bias of the spring motor. As will be appreciated, this results in a much simpler retractor construction in which the frame merely supports the drum and spring motor and the saddle assembly carrying pendulum and pawl is staked into cradle locating position in the frame. The ratchet elements on the drum rotate in accord with the withdrawal or retraction of webbing. In the withdrawal direction, the teeth of the ratchet are in a lock attitude with respect to the pawl teeth but are not engaged therewith in locking relation until the pendulum is displaced. Because of this simplicity so that the saddle pawl and pendulum are separately provided and mounted, a simpler and more accurate construction results and a redundant locking system can also be applied to the retractor of the present invention. Using this construction, a lighter and cheaper lock system is available because the saddle may then be precision formed in suitable plastic material with high repetitive accuracy and resulting good dimensional control.

IN THE DRAWINGS

SPECIFIC DESCRIPTION

Figure 1:
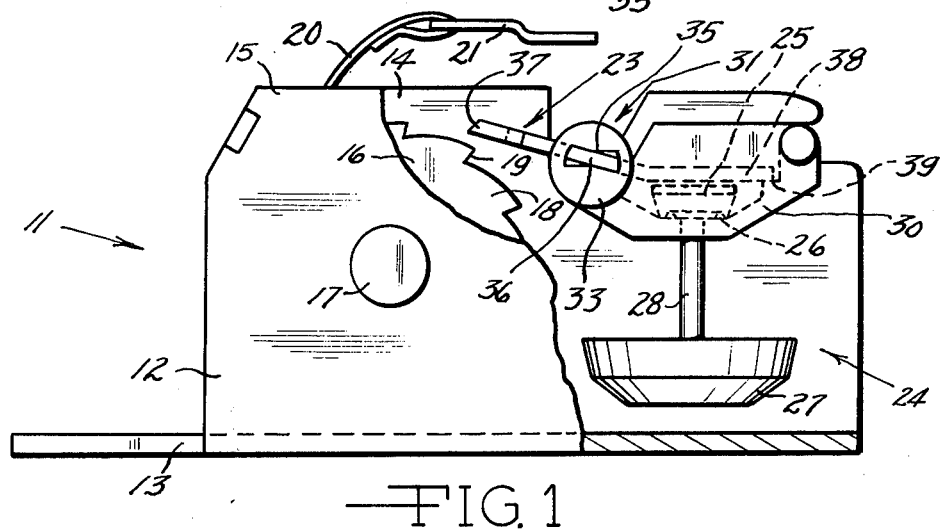
FIG. 1 is a side elevation view of a retractor in accord with the present invention and is cut away to show the pawl in non-locking position and with the tab extension resting on a pedestal in registry above the head of the pendulum.

Referring to the drawings and with particularity to the FIG. 1 thereof, the invention is seen embodied in a retractor 11 which includes a retractor frame or chassis 12 having a bottom web 13 and a pair of integral upstanding side flanges 14 and 15 which (between them) rotationally support drum 16 on the shaft 17 and the drum 16 includes a pair of spaced-apart end ratchet flanges 18 which include the ratchet teeth 19. The ratchet teeth 19 rotate with the drum 16 and drum 16 rotates against, as will be seen, a customary bias of a spring motor which urges the drum 16 to rewind the harness or webbing 20 onto the drum 16. The harness 20 usually includes terminal hardware such as the buckle tongue 21, as shown. This allows the harness 20 to be secured around a wearer in a vehicle. The retractor 11 is secured to the vehicle (not shown) as by bolts through the web 13 at suitable mount openings as the opening 22 in FIG. 2. As will be seen, the attitude for mounting the retractor 11 is such that the pendulum hangs vertically when the vehicle is at rest on reasonably level terrain. As thus described, the webbing 20 may be withdrawn from the drum 16 against the usual bias of a spring rewind motor and upon release the same spring motor will rewind the webbing 20 on the spool or drum 16. The retractor movement is quiet, chatter-free, and is limited only by the storage capacity of the drum 16.

In order to provide an inertially responsive lock for the drum 16 and retractor 11, it is necessary to mount a pawl 23 for pivotal movement toward locking engagement with the ratchet teeth 19 and return. Then inertial sensing means such as the rigid pendulum structure 24 must be provided to act on the pawl 23 when an inertial imbalance occurs. The pendulum 24 is shown at rest in the vertical depending position in the FIG. 1 with the head 25 of the pendulum 24 resting on a circular fulcrum or seat 26. The mass 27 of the pendulum 24 is depending from the head 25 on the rod 28. The pendulum 24 and pawl 23 are supported by a saddle 30 and the saddle 30 is supported and held in the retractor body 12 between the flanges 14 and 15 of the body 12 by grasping the pairs of protuberances 31 and 32 in axial array. These, as will be appreciated, impinge on the perimeters of the lanced openings 33 and 34 in the flanges 14 and 15 of the frame 12. The pair of protuberances 31 from the pan-like saddle 30 are in axial and fulcrum support of the pawl element 23. The cylindrical protuberances 32 will be seen to facilitate the assembly of the saddle 30 to the retractor frame 12 by pivotally locating the saddle 30 allowing it to be tilted into and seated within the lanced opening 33 at the protuberances 31.

Figure 2:
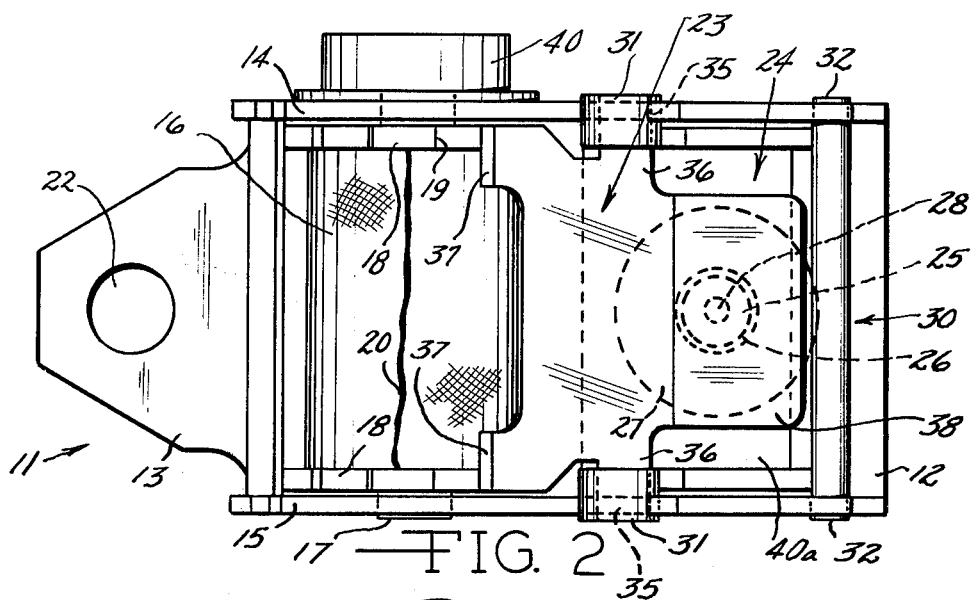
FIG. 2 is a top plan view of the retractor construction of FIG. 1 and illustrating the arrangement of pawl and pendulum to the saddle and the saddle supported in the retractor frame.
Figure 3:
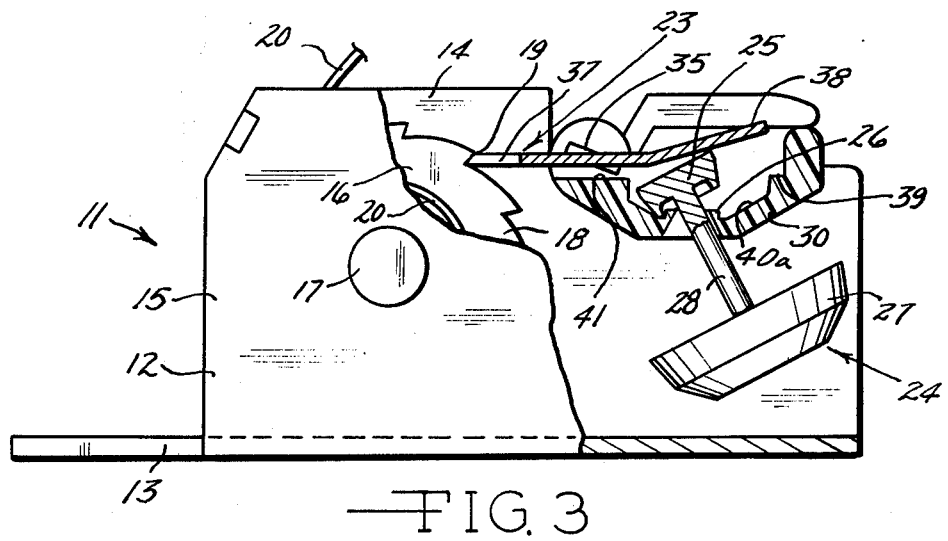
FIG. 3 is a side elevation view as in the FIG. 1 of the retractor of the present invention but with the pendulum tilted to tilt the pawl into locking engagement with the ratchets of the drum and both pawl and pendulum supported by the saddle.

Butterfly shaped recesses 35 are provided through the protuberances 31 in support of the bar portion 36 of the pawl 23. This permits, as will be seen, the pawl 23 to be tilted toward engagement with the teeth 19 of the ratchet flanges 18, and the center of the recesses 35 act as fulcrums which allow the bar portion 36 of the pawl 23 to rock toward and away from lock relationship. The tooth portion 37 of the pawl 23 is beveled to facilitate locking engagement with the ratchet teeth 19. A tab portion 38 of the pawl 23 extends rearwardly (to the right as shown in FIGS. 1, 2 and 3) and rests upon a pedestal 39 formed in the web portion 40a of the saddle 30. A gravity bias assures this position normally so that the tab extension 38 is in parallel registry above the pendulum head 25 and this gravity bias may be augmented as by a spring where desired. Such augmentation provides a means of dampening the sensitivity of the pendulum 24 to displacement. The pedestal 39 in the saddle 30 thus provides a limit stop against which the pawl 23 rests under normal circumstances when the pendulum 24 is vertically depending.

In the FIG. 2 the construction described in respect to FIG. 1 is oriented best and the rewind spring motor 40 is seen secured to the flange 14. While the spring is not shown, it is of the spiral type driveably secured to the drum 16 at one end and secured at the other end to the flange 14 of frame 12. The ratchet flanges 18 of the drum 16 are seen to be in interference registry with the teeth 37 of the pawl element 23. In the FIG. 3 the circular knife edge seat 26 providing omnidirectional sensing is best appreciated and the head 25 is tilted as by an imbalance in inertial forces causing the omnidirectional tilting of the head 25 upwardly and impinging on the tab extension 38 of the pawl 23 causing it to tilt on the fulcrum formed by the butterfly openings 35 and thereby engaging the pawl teeth 37 with the ratchet teeth 19 and halting any further withdrawal of webbing 20 or rotation of the drum 16. The lock stresses are conveyed into the pawl 23 through the saddle 30 and into the frame 12 at the lanced openings 32 and 33 in the flanges 14 and 15. A buttress 41 in the web portion 40a of the saddle 30 provides an added obstacle to overrun but the stresses predominantly flow into the saddle 30 at the interface between the protuberances 31 at the opening 35 and at the outer perimeter of the protuberances 31 at the openings 33. In FIG. 3 it will be appreciated that any substantial tilting of the pendulum 24 in any direction results in the elevation of the head 25 and tilting displacement of the pawl 23 to locking position.

The saddle 30 is preferably injection molded from a suitable and durable shock resistant plastic or resin material. The selected resin should provide good dimensional control and repetitive accuracy for mounting the one-piece pawl element 23 and the two-piece pendulum 24 while precision locating its assembly position in respect to the retractor frame 12.

Figure 4:
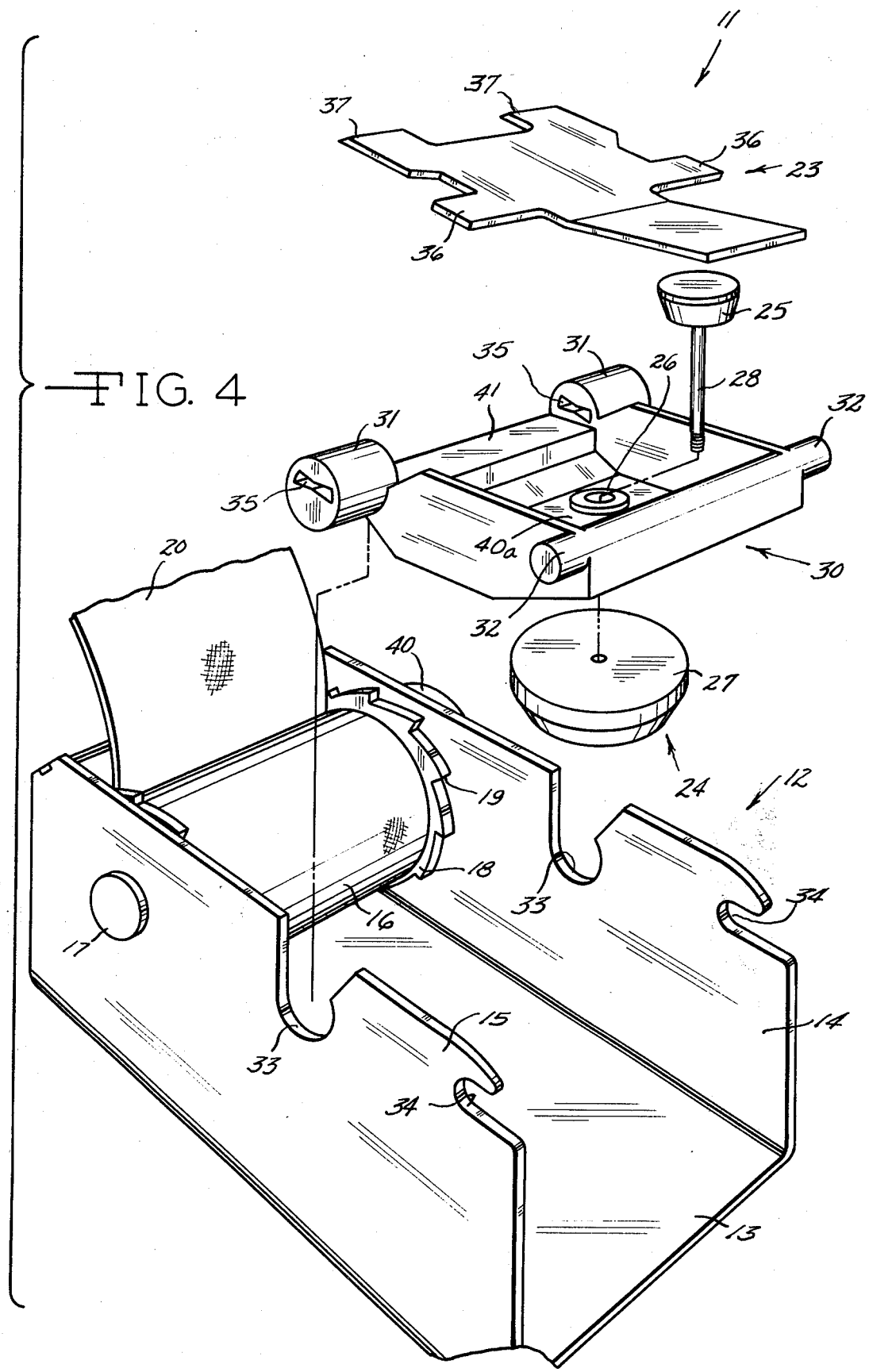
FIG. 4 is an exploded perspective view of the retractor and the saddle and showing the assembly of pawl element and pendulum and mounting procedures and provisions for securing the saddle to the lanced journal provisions in the flanges of the retractor body or chassis.

FIG. 4 best illustrates the assembly simplicity of the thus described retractor 11. The basic retractor 11 is seen to comprise two assembly clusters. These are the frame 12 in support of the ratchet drum 16 and rewind motor 40 with attendant harness webbing 20; and the saddle assembly comprising the saddle 30 in support of the pendulum 24 and the pawl member 23. The two are integrated by assembly together placing the protuberances 32 in the prearranged and axially aligned openings 34 and then tilting in the protuberances 31 into the prearranged and axially aligned openings 33 to lock by compression deformation or by staking.

Noteworthy in the described construction is that the saddle support allows the use of a vehicle sensitive inertial property in the setting of almost any safety belt retractor. Accordingly, a redundant system combining vehicle sensitive and webbing sensitive locking properties is possible. The parts are generally reduced. The dimensional control is substantially better and the assembly is substantially simplified. The two-piece pendulum where the head and rod are integral represents a simplification of assembly on the circular seat which is precision formed in the webbing of the saddle. The integral buttresses in the saddle provide stop locating functions in respect to the movable pawl.

While a precise embodiment is shown in which the retractor is mounted horizontally in its frame and the pendulum is vertical, such a construction may be obviously modified to suit variant installations as where the retractor may be mounted at variant angles from the horizontal as in the seats or door posts of vehicles. The pendulum is still oriented in its vertical relation in normal usage but the pawl may be configured differently on the frame and saddle reoriented on the frame to properly relate the pawl teeth to the ratchet teeth on the retractor drum. Other modifications well known in the art may be used and all of such modifications and improvements are intended to be included in the present invention limited only by the scope of the hereinafter appended claims.

The assembly of the pawl element 23 in the saddle is by sliding the longer of the bar portions 36 of the pawl 23 into one of the butterfly slots 35 and this provides clearance for the bar portion 36 to be aligned between the protuberances 31 so that axial movement of the bar portion 36, then locates both ends of the bar portion 36 of the pawl 23 in the butterfly shaped recesses 35 for tilting support. This assembly is best appreciated by reference to the FIG. 4 and to FIG. 1. As thus assembled, the pawl 23 cannot escape from pivotal capture in the protuberances 31 because the tooth extensions 37 of the pawl 23 are secured by the frame flanges 14 and 15 from lateral movement.

We claim:

1. In a retractor with a ratchet flanged drum, the vehicle sensitive inertial locking structure comprising:
   a retractor frame defining precision located and prearranged openings;
   a separate saddle structure mounted in said frame and located in said openings;
   a pawl element pivotable in said saddle structure and having an extending tab, said pawl element having ratchet engaging teeth tiltable with said pawl into locking engagement with said ratchet; and
   a headed omnidirectional rigid pendulum supported by said saddle and beneath said extending tab of said pawl, said headed pendulum, upon displacement, tilting said pawl.

2. In the structure of claim 1 wherein said saddle includes a circular knife edge defining an opening therethrough and said circular knife edge supporting said rigid headed pendulum.

3. In the structure of claim 1 wherein said saddle structure is preassembled to include said pendulum and said pawl and secured to said retractor frame at said prearranged openings in said retractor frame.

4. In the combination set forth in claim 3 wherein said saddle is provided with plural axially aligned pairs of protuberances and said protuberances being secured in said prearranged openings in said retractor frame.

5. An inertial retractor of the vehicle sensitive type comprising:
   a retractor frame having selected pairs of openings;
   a webbing support drum biased to rewind rotatably supported in said frame and including ratchet flanges rotatable with said drum;
   a resin saddle structure supported by said frame and comprising an integral plurality of pairs of indexing protuberances, said protuberances impinging on said selected pairs openings provided in said frame and a web platform portion of said saddle structure providing therethrough a vertical opening surrounded by an annular raised seat;

a pawl with ratchet engaging teeth pivotally supported between one pair of coaxially related protuberances and said pawl and having a tab extension registrably over said seat in said web portion of said saddle; and a headed pendulum depending through said vertical opening and supported by said seat which, upon displacement from vertical, tilts said pawl into locking engagement with the ratchet flanges of said drum in prevention of webbing withdrawal from said drum.

6. In the structure of claim 5 wherein said saddle is integrally formed from tough, dimensionally stable and impact resistant plastic material.

7. In the structure of claim 5 wherein said resin saddle includes a resin fulcrum upon which said pawl tilts and a resin support for said headed pendulum.

* * * * *